United States Patent [19]

Hornbostel et al.

[11] Patent Number: 4,995,008

[45] Date of Patent: Feb. 19, 1991

[54] METHOD OF USING A CIRCULARLY-POLARIZED SOURCE TO CHARACTERIZE SEISMIC ANISOTROPY

[75] Inventors: Scott C. Hornbostel; Azik I. Perelberg, both of Houston, Tex.

[73] Assignee: Exxon Production Research Company, Houston, Tex.

[21] Appl. No.: 457,267

[22] Filed: Dec. 27, 1989

[51] Int. Cl.$^5$ .......................... G01V 1/34; G01V 1/28; G01V 1/053

[52] U.S. Cl. ........................................ 367/75; 367/31; 73/152; 73/594

[58] Field of Search ...................... 367/31, 75; 73/152, 73/594

[56] References Cited

U.S. PATENT DOCUMENTS

| | | |
|---|---|---|
| 3,593,255 | 7/1971 | White . |
| 3,821,740 | 6/1974 | Ehrlich . |
| 3,943,369 | 3/1976 | Saeva ............................ 250/568 |
| 4,073,571 | 2/1978 | Grinberg et al. . |
| 4,106,015 | 8/1978 | Beguin et al. ................... 543/5 W |
| 4,442,350 | 4/1984 | Rashleigh ......................... 356/33 |
| 4,450,540 | 5/1984 | Mallett . |
| 4,479,206 | 10/1984 | Granberg et al. . |
| 4,548,631 | 10/1985 | Arditty et al. . |
| 4,606,014 | 8/1986 | Winbow et al. . |
| 4,631,964 | 12/1986 | Sprunt et al. .................... 73/594 |
| 4,641,520 | 2/1987 | Mao . |
| 4,646,754 | 3/1987 | Seale ............................ 128/774 |
| 4,649,526 | 3/1987 | Winbow et al. . |
| 4,682,308 | 7/1987 | Chung . |
| 4,685,091 | 8/1987 | Chung et al. . |
| 4,703,918 | 11/1987 | Pindera ......................... 356/35 |
| 4,706,224 | 11/1987 | Alford . |
| 4,712,641 | 12/1987 | Chelminski ..................... 367/75 |
| 4,713,968 | 12/1987 | Yale . |
| 4,719,507 | 1/1988 | Airhart .......................... 367/75 |
| 4,728,961 | 3/1988 | Bossuet et al. . |
| 4,755,972 | 7/1988 | Hanson et al. ................... 367/75 |
| 4,774,693 | 9/1988 | Winbow et al. . |
| 4,789,969 | 12/1988 | Naville . |
| 4,794,572 | 12/1988 | Sondergeld et al. . |
| 4,803,666 | 2/1989 | Alford . |
| 4,817,061 | 3/1989 | Alford et al. . |
| 4,832,148 | 5/1989 | Becker et al. . |
| 4,839,869 | 6/1989 | Corcoran ........................ 367/73 |
| 4,907,206 | 3/1990 | Rai ............................... 367/68 |

FOREIGN PATENT DOCUMENTS

| | | |
|---|---|---|
| 1156488 | 11/1983 | Canada . |
| 0031989 | 7/1981 | European Pat. Off. . |
| 069076 | 1/1986 | European Pat. Off. . |
| 0224350 | 6/1987 | European Pat. Off. . |
| 0264323 | 4/1988 | European Pat. Off. . |
| 950842 | 8/1982 | U.S.S.R. . |
| 2165701 | 4/1986 | United Kingdom . |
| 2188506 | 9/1987 | United Kingdom . |

OTHER PUBLICATIONS

Yale et al., "Prediction of Fracture Direction using Shear Acoustic Anisotropy", The Log Analyst, March-Apr., 1989, pp. 65-70.

Sriram, K. P., "Observations of Weak . . . , Texas"; 57th Annu. Soc. Explor. Geophys. Int. Mtg., 10/15/87, PAP W2-7; abst. only.

"Seismic Detection of Oriented Fractures", Dr. Heloise Lynn, Oil & Gas Journal, Aug. 4, 1986, pp. 54-55.

"Detection of Anisotropy using Shear-Wave Splitting in VSP Surveys: Requirements and Applications", expanded abstracts with biographics for the 56th SEG Meeting, pp. 391-394, Naville (1986).

"Practical Use of ShearWave Splitting in VSP Survey", Compagnie Generale de Geophysique, Naville.

Primary Examiner—Nelson Moskowitz
Attorney, Agent, or Firm—Vaden, Eickenroht, Thompson & Boulware

[57] ABSTRACT

A method is disclosed for detecting the presence or absence of anisotropy in a subterranean geological formation and for determining its orientation. In a first preferred embodiment, the method utilizes a seismic source which generates circularly polarized shear waves and directs them to a target formation. These waves undergo wave splitting on encountering anisotropic conditions and the resulting components are linearly polarized and are reflected to the surface or to a bore hole where they are detected by receivers. The reflected arrivals are then analyzed to detect the pres- (Abstract continued on next page.)

ence and orientation of the linearly polarized arrivals as is known in the prior art. In an alternative preferred embodiment, the use of a circularly polarized source is simulated by generating two orthogonal waves linearly polarized 90° out of phase with respect to each other. Each wave undergoes splitting upon encountering anisotropic conditions in the formation and the resulting components are reflected back to the surface and detected by receivers.

In a preferred receiver embodiment, a first receiver is used to detect the reflected arrivals of the first components of each wave. A second receiver oriented at 90° with respect to the first receiver is then used to detect the reflected arrivals of the second components of each wave. A first receiver component of a circular source is then simulated by summing the reflected arrival of the first receiver component of the first source wave with the Hilbert transform of the first receiver component of the second source wave. A second simulated receiver component of a circular source is then generated by summing the second receiver component of the first source wave with the Hilbert transform of the second receiver component of the second source wave. The simulated components are than analyzed to detect the presence and orientation of the linearly polarized components as is known in the prior art.

6 Claims, 2 Drawing Sheets

METHOD OF USING A CIRCULARLY-POLARIZED SOURCE TO CHARACTERIZE SEISMIC ANISOTROPY

BACKGROUND OF THE INVENTION

1. Field of Invention

This invention pertains generally to a method for investigation of subterranean geological formations with circularly polarized energy and more particularly to the determination of anisotropy using circularly polarized energy.

2. Description of Prior Art

It is well known in the geological and geophysical arts that cracks and fissures in the rock strata create anisotropic conditions for acoustical energy propagation. Attempts have been made to exploit the presence and orientation of these conditions inasmuch as the geological features which create them indicate a high likelihood for the presence of hydrocarbons. These previous attempts have all utilized the wave splitting characteristics exhibited by these features when exposed to linearly polarized energy. This invention employs circularly, as opposed to linearly, polarized energy to obviate many of the major disadvantages accompanying the use of linearly polarized energy while yielding improved results in the exploration of anisotropic geological formations.

The prior art teaches that when a linearly polarized wave ideally encounters an anisotropic condition it is split into two linear components that are polarized along the two axes of the anisotropic feature orthogonal to direction of propagation of the source wave. The anisotropy will then attenuate the amplitude and slow the propagation of the component which is polarized normal to the anisotropic feature. The components are eventually reflected to receivers located at the surface or suspended in a borehole whereupon the reflected arrivals are recorded and analyzed. The traces representing the reflected arrivals are analyzed for differences in amplitude and propagation velocity using, for example, particle motion ellipticity to determine the presence and orientation of anisotropic features in the geological formation.

Typical of such approaches in the prior art are U.S. Pat. No. 4,789,969, to Naville, U.S. Pat. No. 4,817,061, to Alford et al., the publication "Detection of Anisotropy Using Shear Wave Splitting and VSP Surveys: Requirements and Applications", by Charles Naville appearing in Expanded Abstracts with Biographies for the 56th SEG Meeting, pps. 391-394, and the publication "Practical Use of Shear Wave Splitting in VSP Surveys", by Charles Naville.

The translation of the theory into practice is naturally fraught with many complications. One major drawback to the practice of the prior art is that surface waves and random noise generate ellipticity in the data and therefore error in this method of analysis. Another major drawback occurs when the direction of propagation of the source wave is oriented too closely along one of the principal axes of the anisotropic feature, which prevents wave splitting so that there is no ellipticity in the data even though anisotropic conditions exist. The presence or absence of ellipticity therefore does not necessarily accurately indicate anisotropic conditions or the orientation of the anisotropic axes.

It is therefore a feature of the invention to provide a better way to minimize the interference of surface waves and random noise in the detection of anisotropic conditions in geological formations.

It is a further feature of the invention to provide a better method of ascertaining the presence of anisotropic conditions and the orientation of the principle axes of anisotropy by detecting such conditions regardless of the angle of propagation of the source wave with respect to the principal axes of anisotropy.

SUMMARY OF THE INVENTION

The current invention in its preferred embodiment employs a source to generate a circularly polarized wave that will always split into perpendicular linear components in anisotropic media. A circularly polarized source wave which does not encounter any anisotropy will yield reflected arrivals which are also circularly polarized since no wave splitting can occur and will therefore necessarily indicate the absence of anisotropy. Conversely, linearly polarized reflected arrivals necessarily indicate anisotropy and its orientation since wave splitting must have occurred.

The invention also alternatively provides for simulating a circularly polarized source with linearly polarized sources. A first linearly polarized source wave is generated and directed toward the target formation. The reflected arrivals of the components resulting from the splitting of the source wave are detected and recorded by two receivers oriented orthogonally with respect to each other. A second wave linearly polarized orthogonally with respect to the polarization of the first wave is then generated and directed toward the target formation and the reflected arrivals of the components detected and recorded in the same manner. This results in four traces being recorded. One simulated receiver component from a circularly polarized source wave is then generated by summing the recorded first receiver of the first source wave with the Hilbert transform of the first reflected arrival of the second source wave. The second simulated receiver component from a circularly polarized source wave is then generated by summing the recorded second receiver of the first source wave with the Hilbert transform of the recorded second receiver of the second source wave. The simulated components are then analyzed to detect the nature and orientation of the polarization in the same manner as in the first preferred embodiment.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof which are illustrated in the drawings, which form a part of this specification. It is to be noted, however, that the appended drawings illustrate only typical preferred embodiments of the invention and are not to be considered limiting of its scope as the invention may admit to other equally effective embodiments.

IN THE DRAWINGS

Figure 1:
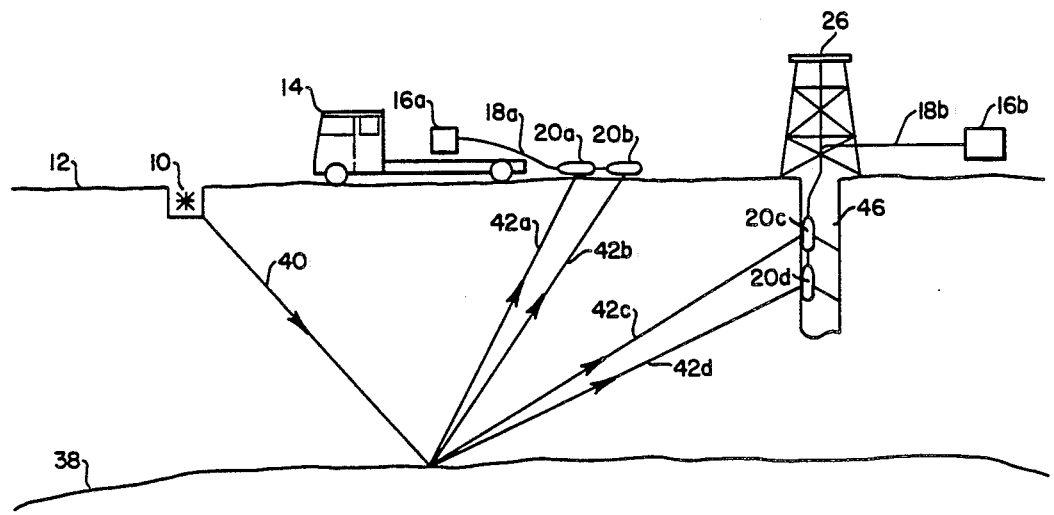

FIG. 1 illustrates two common geological exploration techniques that may be used to implement the invention.

Figure 2:
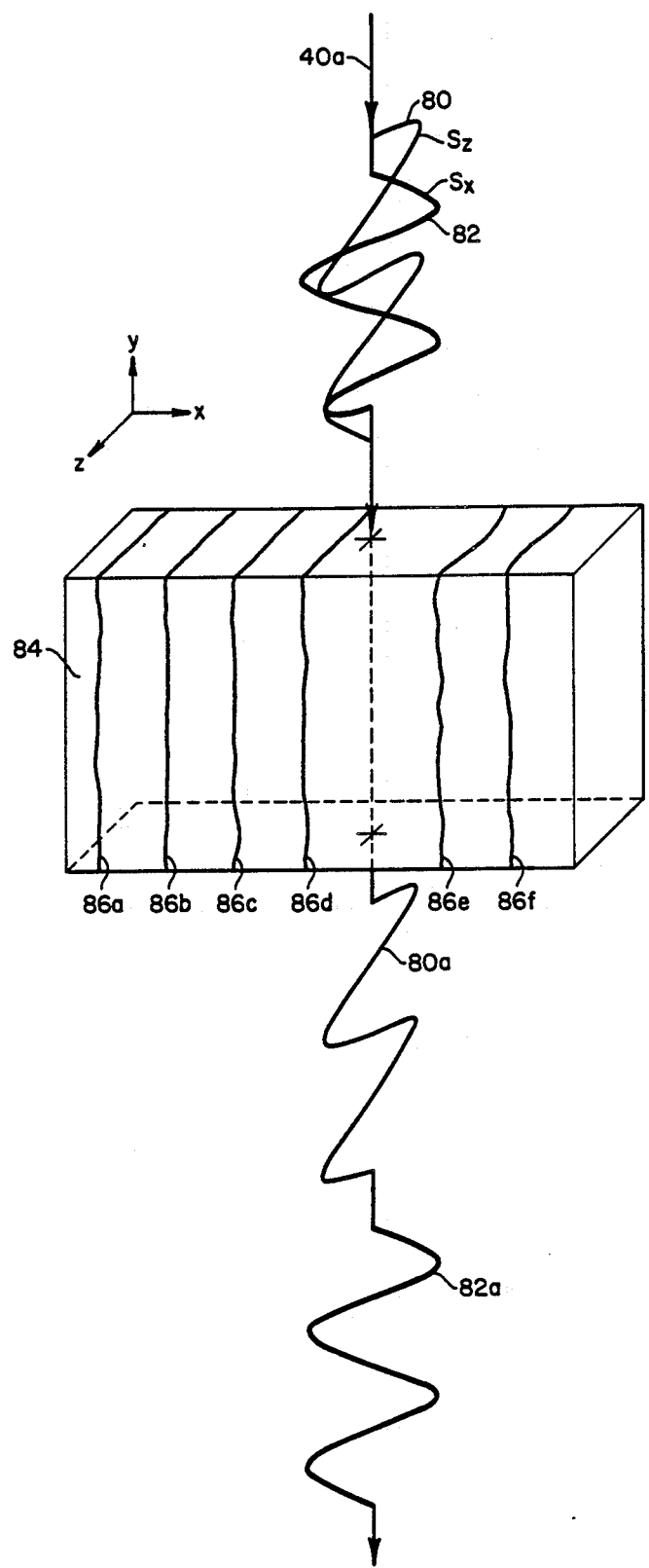

FIG. 2 depicts a conceptualization of the effect of wave splitting on circularly polarized energy wave.

Figure 3:
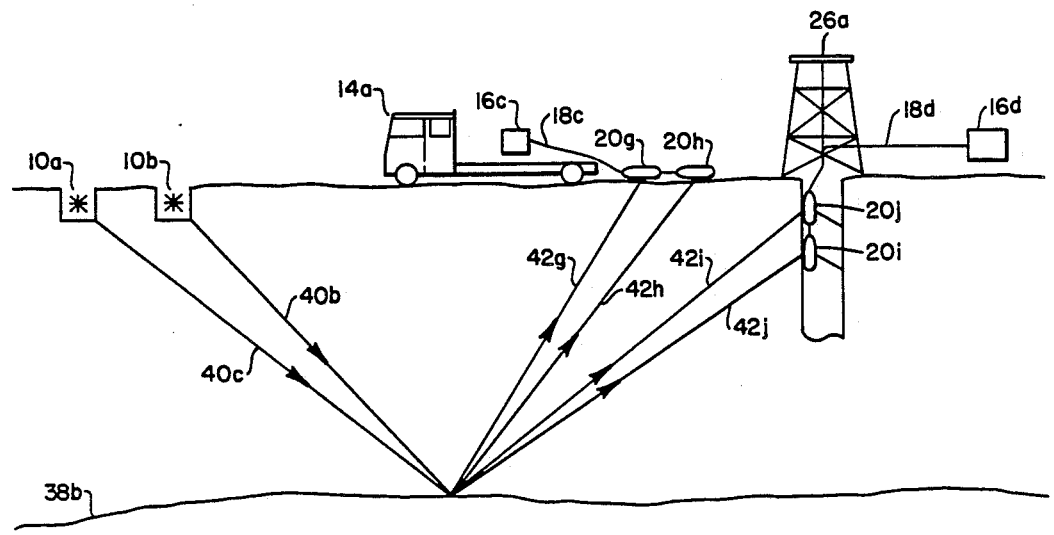

FIG. 3 illustrates the practice of the invention wherein a circularly polarized wave is simulated with two linearly polarized waves.

DESCRIPTION OF THE PRIMARY EMBODIMENTS

FIG. 1 illustrates two common forms of exploration of geological formations. A shear wave source 10 at or near ground surface 12 imparts a directed shear source wave 40 of linearly polarized energy, typically elastic in nature, toward the target formation. A reflecting barrier 38 in the formation reflects the energy back toward ground surface 12 in the form of reflected waves 42a–d. In seismic exploration, receivers 20a–b are positioned in contact with L the ground to detect the reflected arrivals of waves 42a–b. Receivers 20a–b transmit data representing the reflected arrivals of waves 42a–b via cable 18a to a means 16a for recording or transmitting the data. Typically, means 16a is located at or near an instrument truck 14 for mobility. In another form of exploration known as vertical seismic profiling, receivers 20c–d are suspended from a drilling structure 26 via cable 18b and clamped to the wall of borehole 46. Receivers 20c–d detect the reflected arrivals of waves 42c–d and transmit data via cable 18b to a means 16b for recording or transmitting the data.

It is known in the art that when shear source wave 40 is linearly polarized and encounters anisotropic conditions, it will split into its two orthogonal linearly polarized components. As the linearly polarized components travel through the formation, the anisotropic conditions cause them to attenuate and propagate at different rates. The orthogonal linearly polarized components are eventually reflected and detected at the surface by receivers 20a–b or receivers 20c–d as reflected arrivals of waves 42a–b or 42c–d. When the orthogonal linearly polarized components have begun separating but are not completely separated, they will appear as an elliptical arrival at the receivers. The data representing the reflected arrivals is then analyzed for the presence of ellipticity which may indicate the presence or orientation of the anisotropic conditions of the formation. One typical technique of analyzing reflected arrivals for ellipticity is the plotting of hodograms as is disclosed in the publication "Practical Use of Shear Wave Splitting in VSP Surveys" by Charles Naville. The present invention instead employs a common mathematical matrix analysis performed on a digital computer.

FIG. 2 depicts a conceptualization of the effect of wave splitting on a circularly polarized energy wave. Shear source wave 40a propagates vertically, or in the Y direction, and is composed of linearly polarized component 82 polarized in the horizontal or X-direction and linearly polarized component 80 polarized in the Z-direction, i.e., orthogonally to both the X- and Y-directions. Since shear source wave 40a is circularly polarized, linearly polarized components 80 and 82 are 90° out of phase with respect to each other and have the same amplitude. On encountering a geological formation 84 containing anisotropic conditions 86a–86f shear source wave 40a will split into its linearly polarized components 80a and 82a. Linearly polarized components 80a and 82a are, in themselves, linearly polarized waves which are polarized along the two axes of the anisotropic feature. Linearly polarized components 80a and 82a may subsequently be split upon encountering anisotropic conditions in accordance with the teaching of the prior art but the statistical probability that they or the product of any subsequent wave splitting will achieve a relationship wherein a circular polarization will be approximated is sufficiently low to be discounted. The presence of linearly polarized reflected arrivals will consequently indicate the presence of anisotropy and the presence of circularly polarized reflected arrivals will necessarily indicate the absence of anisotropy.

Returning to FIG. 1, in the practice of the invention in accordance with a first preferred embodiment, shear wave source 10 generates a circularly polarized shear source wave 40 and directs it at the target formation whereupon it encounters reflection barrier 38 and is reflected to receivers 20a–b at the surface or receivers 20c–d in the borehole, depending upon which type of surveying technique is being employed. If neither shear source wave 40 nor the waves 42a–d encounter anisotropic conditions, the reflected arrivals of waves 42a–d will be circularly polarized. If shear source wave 40 or any of the waves 42a–d encounter anisotropic conditions then the wave splitting as discussed with the conceptualization depicted in FIG. 2 will occur and the reflected arrivals of waves 42a–d will consist of the resultant first and second linearly polarized components 80a and 82a (shown in FIG. 2). In reality, if either shear source wave 40 or waves 42a–d encounter a region of anisotropy, it is probable that additional anisotropy will be encountered, and therefore linearly polarized components 80a and 82a shown in FIG. 2 will undergo subsequent wave splitting and the reflected arrivals of waves 42a–d will consequently consist of a plurality of such components. This plurality may be separated for analysis based on delays in propagation as is well known in the art.

FIG. 3 depicts an alternative preferred embodiment of the invention wherein wave splitting of circularly polarized source wave is simulated by using two linearly polarized source waves that are polarized orthogonally with respect to each other. Shear wave source 10a generates a first linearly polarized shear source wave 40c and directs it at the target formation. The shear source wave 40c propagates until it reaches reflection barrier 38b where it is reflected as waves 42g–j to the surface. If anisotropic conditions are encountered by either shear source wave 40c or waves 42g–j then shear wave splitting will occur in a manner that is well known in the art, but the detection of the reflected arrivals differs from the practice of the prior art. In the practice of the current invention, receivers 20h and 20i must be oriented at 90° with respect to the orientation of receivers 20g and 20j, respectively. Orientation simply means that the alignment of the sensing element in the receiver is such that the receiver will detect particle motion in a predetermined direction. Shear wave source 10b will then next generate a shear source wave 40b which is linearly polarized orthogonally with respect to shear source wave 40c. The shear source wave 40b is then directed toward the formation, reflected by reflection barrier 38b, and the reflected arrivals of waves 42g–j are detected by the receivers 20g–j in the manner heretofor described with respect to shear source wave 40c.

This results in four reflected arrivals being recorded in either the surface or the borehole embodiment. The use of a circularly polarized source is then simulated by deriving simulated receiver components. To generate the first simulated receiver component, a Hilbert transform is performed on the reflected arrival of wave 42h generated by shear wave source 10b and detected by receiver 20h. It is well known in the art that the Hilbert transform merely produces a 90° phase shift in the reflected arrival. The phase shifted reflected arrival is then summed with the reflected arrival of wave 42h generated by shear wave source 10a and detected by receiver 20h. A second simulated receiver component is generated by taking the Hilbert transform of the reflected arrival of wave 42g generated by shear wave source 10b and detected by receiver 20g and summing it with the reflected arrival of wave 42g generated by shear wave source 10a and detected by receiver 20g. The simulated components are then analyzed to detect the presence or absence of linear polarization and its orientation as is well known in the art.

This alternative embodiment of the invention could be extrapolated to be practiced in a number of different manners as will be easily seen by those who practice the art. For instance, shear wave sources 10a and 10b in FIG. 2 could be oriented orthogonally with respect to each other and operated simultaneously with one shear source wave being the Hilbert transform of the other. Similarly, receivers 20g and 20h or receivers 20i and 20j could be replaced by a single receiver oriented in one direction to detect the reflected arrivals resulting from first and second source waves and then oriented at 90° with respect to the first direction to detect the reflected arrivals resulting from the transmitted first and second source waves. The alternative embodiment wherein use of a circular source is simulated shown in FIG. 3 may also be employed by replacing shear wave sources 10a and 10b with a source which actually is circularly polarizing. The alternative embodiments can be extrapolated to be practiced in still a number of other embodiments and it is to be understood that the preferred embodiments disclosed herein are not exhaustive but merely illustrative.

What is claimed is:

1. The method of detecting seismic anisotropy and determining its orientation in a lithological formation, which comprises,
    directing a wave of circularly polarized energy toward said lithological formation,
    detecting reflected arrivals of said wave from said lithological formation using two-component receivers, and
    ascertaining the presence and orientation of linear polarization in said reflected arrivals as an indication of the presence and orientation of anisotropy.

2. The method of claim 1 wherein detecting reflected arrivals comprises the steps of,
    detecting said reflected arrival of a first linearly polarized component of said circularly polarized energy oriented in a first direction, and
    detecting said reflected arrival of a second linearly polarized component of said circularly polarized energy oriented in a second direction, said second direction being othogonal to said first direction.

3. The method of simulating the sourcing and detection of circularly polarized energy for detecting seismic anisotropy and determining its orientation in a lithological formation, which comprises,
    directing a first wave and a second wave of linearly polarized energy toward said lithological formation, said first wave and said second wave being linearly polarized orthogonally with respect to each other,
    detecting the reflected arrivals of said first wave and of said second wave with a receiver oriented in a first direction,
    detecting the reflected arrivals of said first wave and of said second wave with said receiver oriented in a second direction othogonal with respect to said first direction,
    generating a first simulated reflected arrival by summing said reflected arrival of said first wave detected by said receiver oriented in said first direction and the Hilbert transform of said reflected arrival of said second wave detected by said receiver oriented in said first direction,
    generating a second simulated reflected arrival by summing said reflected arrival of said first wave detected by said receiver oriented in said second direction and the Hilbert transform of said reflected arrival of said second wave detected by said receiver oriented in said second direction, and
    ascertaining the presence and orientation of simulated linear polarization from said first simulated reflected arrival and said second simulated reflected arrival as an indication of the presence and orientation of anisotropy.

4. The method of claim 3 wherein said first wave is generated by a source oriented in a first direction and then said second wave is generated by said source oriented in a second direction orthogonal with respect to said first direction.

5. The method of claim 3 wherein said first wave is generated by a first source and said second waves is generated by a second source, said first source said second source simultaneously generating said first wave and said second wave, respectively, said second wave being the Hilbert transform of said first wave.

6. The method of simulating the sourcing and detection of circularly polarized energy for detecting seismic anisotropy and determining its orientation in a lithological formation, which comprises,
    directing a first wave and a second wave of linearly polarized energy toward said lithological formation, said first wave and said second wave being linearly polarized orthogonally with respect to each other,
    detecting the reflected arrivals of said first wave and of said second wave with a first receiver oriented in a first direction and a second receiver in a second direction, said second direction, being orthogonal to said first direction, using two orthogonal receivers in both cases,
    generating a first simulated reflected arrival by summing said reflected arrival detected by said first receiver of said first wave and the Hilbert transform of said reflected arrival detected by said first receiver of said second wave,
    generating a second simulated reflected arrival by summing said reflected arrival detected by said second receiver of said first wave and the Hilbert transform of said reflected arrival detected by said second receiver of said second wave, and
    ascertaining the presence and orientation of linear arrivals from said first simulated reflected arrival and said second simulated reflected arrival as an indication of the presence and orientation of anisotropy.

* * * * *